(12) United States Patent
Halahmi et al.

(10) Patent No.: US 7,638,745 B2
(45) Date of Patent: Dec. 29, 2009

(54) DEVICE FOR PHOTON ENERGY MEASUREMENT AND METHOD THEREOF

(75) Inventors: Erez Halahmi, Bazra (IL); Ron Naaman, Rehovot (IL); Leeor Kronik, Rehovot (IL)

(73) Assignee: Novatrans Group SA, Vaumarcus NE (CH)

( * ) Notice: Subject to any disclaimer, the term of this patent is extended or adjusted under 35 U.S.C. 154(b) by 0 days.

(21) Appl. No.: 11/597,955

(22) PCT Filed: Jun. 1, 2005

(86) PCT No.: PCT/IL2005/000564

§ 371 (c)(1),
(2), (4) Date: Nov. 28, 2006

(87) PCT Pub. No.: WO2005/118962

PCT Pub. Date: Dec. 15, 2005

(65) Prior Publication Data

US 2008/0067323 A1    Mar. 20, 2008

Related U.S. Application Data

(60) Provisional application No. 60/575,426, filed on Jun. 1, 2004.

(51) Int. Cl.
*H01J 40/14* (2006.01)
*H01J 31/50* (2006.01)
*G01J 1/44* (2006.01)

(52) U.S. Cl. .............. 250/207; 250/214 VT; 250/214 R

(58) Field of Classification Search .......... 250/208.1, 250/214 VT, 214 R, 226, 207; 348/216.1, 348/217.1; 313/524, 523, 542, 103 R–105 CM; 358/110, 111

See application file for complete search history.

(56) References Cited

U.S. PATENT DOCUMENTS

| 3,814,993 | A | 6/1974 | Kennedy |
| 4,644,221 | A | 2/1987 | Gutierrez et al. |
| 4,777,403 | A | 10/1988 | Stephenson |
| 5,384,469 | A | 1/1995 | Choi |
| 6,376,985 | B2 * | 4/2002 | Lee et al. .............. 313/542 |
| 6,400,088 | B1 | 6/2002 | Livingston et al. |

OTHER PUBLICATIONS

L.A. DuBridge, "Theory of the Energy Distribution of Photoelectrons", *Phys. Rev.*, vol. 43 pp. 727-741, 1933.
R. Kadyshevitch and R. Naaman, "Photoelectron Transmission through Organized Organic Thins Films", *Phys. Rev. Lett.*, vol. 74 pp. 3443-3446, 1995.
R. Kadyshevitch and R. Naaman, "Electron Transmission Through Thin Organized Organic Films", *Surface and Interface Analysis*, vol. 25 pp. 71-75, 1997.

* cited by examiner

*Primary Examiner*—Que T Le
*Assistant Examiner*—Pascal M Bui-Pho
(74) *Attorney, Agent, or Firm*—The Nath Law Group; Derek Richmond; Susanne M. Hopkins

(57) ABSTRACT

A device and method are presented for use in measuring photon energy. The device comprises at least one pixel unit (10) including a Photocathode (12) that emits electrons in response to absorbed photons; an Anode (14); and a control unit (19) operable for controlling an electric current from the Photocathode (12) to the Anode (14) so as to selectively prevent electrons' arrival to the Anode (14) to thereby scan a spectrum of photon energies incident on the Photocathode (12).

35 Claims, 1 Drawing Sheet

DEVICE FOR PHOTON ENERGY MEASUREMENT AND METHOD THEREOF

This is a National Phase Application filed under 35 U.S.C. 371 as a national stage of PCT/IL2005/000564 filed on Jun. 1, 2005, an application claiming the benefit under 35 USC 119 (e) U.S. Provisional Application No. 60/575,426 filed on Jun. 1, 2004, the entire content of each of which is hereby incorporated by reference in its entirety.

FIELD OF THE INVENTION

This invention relates to a photonic detector device and method.

BACKGROUND OF THE INVENTION

Various known imaging techniques utilizing pixel array detectors, such as CCD, photovoltaic cell, as well as those based on photoemission, typically require the use of color filters in order to obtain a colored picture (i.e., Red, Green, Blue pixels). A full-spectrum image (from IR to UV) can be obtained by combining IR and UV range detectors visible light detectors.

IR detection (in the range of about 1-10 μm), and specifically far-IR detection (8-12 μm), is typically realized in two main approaches. The first approach utilizes Photonic Detectors, namely detectors that are based on the photoelectric effect. The conventional photonic detectors, although being considered today as the best IR detectors, suffer from the unavoidable need for cooling. The second approach utilizes Thermal Detectors, which are detectors that change their temperature in response to absorbed energy. These detectors are insensitive to the wavelength of photons. Two photons of 0.5 eV will have the same effect as one photon of 1 eV. Therefore, filters are used to narrow the bandwidth. Since the detectors are sensitive to a change in their temperature, the requirement for operating with these detectors includes stabilizing the temperature of the detectors and the surroundings to a fixed temperature.

U.S. Pat. No. 3,814,993 discloses a tunable infrared photocathode. The photocathode is structured as a three layer double heterojunction device with a low work function cesium oxide coating on the electron emitting surface. An internal field assistance bias aids the flow of electrons from a narrow bandgap region, where they are photo-generated, to the wider bandgap negative electron affinity surface region for vacuum emission. Here, photons are absorbed in narrow-gap III-V materials, and then electrons are transported via an electric field to a negative electron affinity photocathode. A problem with this technology is associated with the fact that patterns (arrays of electrodes) made from these materials are difficult to manufacture. Moreover, the device suffers from a low sensitivity at room temperature, "real time" tunability is hard to achieve, and "offline" tunability is achieved only through changing the layers composition during the manufacturing stage.

U.S. Pat. No. 4,644,221 discloses a variable sensitivity transmission mode negative electron affinity photocathode, and method of its manufacture. Here, the sensitivity of the photocathode to white or monochromatic light can be varied by varying the back surface recombination velocity of the photoemitting material with an electric field. The basic structure of the photocathode is comprised of a Group III-V element photoemitter on a larger bandgap Group III-V element window substrate. According to this technique, because of surface recombination, some of photoelectrons are prevented from being emitted, and thus an increase of surface recombination results in a decrease of sensitivity. With this technique wavelength tunability is hard to achieve.

U.S. Pat. No. 5,384,469 describes voltage-tunable, multi-color infrared detectors. The detector comprises a superlattice structure having a plurality of quantum well units each separated by a first potential barrier and each having at least two doped quantum wells separated by a second potential barrier. Each of the wells has a lower energy level and a higher energy level. The first potential barriers substantially impede electrons at the lower levels from tunneling therethrough. The second potential barriers permit electrons at the lower levels to tunnel therethrough and prevent energy-level coupling between adjacent ones of the doped quantum wells. A biasing circuit is connected across the semiconductor superlattice structure. A photocurrent sensor is provided for measuring the amount of radiation absorbed by the semiconductor superlattice structure. The superlattice structure is made a part of a hot-electron transistor for providing amplification. Such a Quantum Well Infrared Photodetector (QWIP) typically has poor sensitivity because, as a result of quantum selection rules, only light propagating along the well plane and not perpendicular thereto is absorbed. The spectral sensitivity of the detector is limited to a fairly narrow spectral range.

SUMMARY OF THE INVENTION

There is a need in the art to improve imaging techniques by providing a novel detector device and method, enabling imaging within the entire spectrum by a single image pixel, with almost any desired spectral resolution.

The imaging detector of the present invention is capable of providing a colored output, including the IR and UV spectral regions, within the same image without the need for any processing or alignment. The present invention provides for detecting IR photons with the performance similar to the currently used cooled detectors, without a need for cooling the detector. The detector of the present invention has a simpler and relatively low-cost configuration as compared to the known IR detectors.

Additionally, the present invention takes advantage of using a retarding field in order to analyze the energy of electrons. Such a retarding field effect [L. A. DuBridge, Phys. Rev. 43, 727 (1933); R. Kadyshevitch and R. Naaman, Phys. Rev. Lett. 74, 3443 (1995); Surface and Interface Analysis, 25, 71-75 (1997)], allows for measuring the energy of electrons by applying a varying electric field in a direction opposite to the direction of the electrons' movement.

By taking a derivative of the measured electric current, the spectrum of electrons' energies can be obtained. As the energy of each input photon is correlated with a unique electron energy distribution, by measuring the energy distribution of the electrons in the detector, the original photon energy distribution can be extracted.

According to one aspect of the invention, there is provided a device for use in measuring photon energy, the device comprising at least one pixel unit including a Photocathode exposed to electromagnetic radiation to emit electrons in response to absorbed photons, an Anode, and a control unit configured and operable to apply a retarding electric field for controlling an electric current from the Photocathode to the Anode, so as to selectively prevent the electrons arrival to the Anode, to thereby scan a spectrum of photon energies incident to the Photocathode.

The Photocathode is configured to have a work function lower than the photon energy to be measured. For example, Photocathode may be configured as a structure formed by a semiconductor layer with a coating having negative electron affinity (NEA) that reduces the work function of the Photocathode.

The Anode electrode may be formed with an optically transparent window allowing photons' access to the Photocathode. Alternatively or additionally, the Photocathode may be at least partially transparent (semi-transparent or transmissive). In this case, a thickness of the Photocathode electrode is preferably in order of magnitude of an absorption length for light to be detected.

According to one example of the invention, the control unit includes a Gate electrode in the form of a grid located between the Photocathode and Anode, and a voltage supply unit associated with the Gate. A distance between the Photocathode and the Gate is preferably as small as possible (e.g., on the order of few tens of microns). The Gate electrode is made from a material with a work function higher than the photon energy to be detected. The control unit operates to change gradually a voltage supply to the Gate electrode within a required range, thereby implementing the spectrum scanning. The control unit may operate to vary a speed of changing the Gate voltage, thereby controlling a spectral resolution.

According to another example of the invention, the control unit includes a voltage supply unit associated with Photocathode and/or Anode and operates to vary a potential difference between them, thereby implementing the scanning of the spectrum, while eliminating the need for a Gate grid.

In both examples, the voltage between the Anode and the Photocathode is in the order of the energy of the emitted electrons (e.g. 0.5V for far-IR). Changing the voltage between the Photocathode and Anode in correlation with the Anode current may increase the signal-to-noise of detection.

Preferably, the device also includes an illuminator operable to illuminate the Photocathode electrode with predetermined radiation. This radiation is of a wavelength range of at least the energy of a band gap of the Photocathode structure. Preferably, the intensity of this radiation is about 10 times of the intensity of the photons to be detected. As indicated above, the Photocathode is preferably coated with NEA material. Due to illumination of the Photocathode, electrons are "pumped" to the conduction band of the Photocathode material. The smallest energy given to these electrons causes them to escape to vacuum. Hence, the device of the present invention can be used to detect very low energy photons (about 1 eV or less). If the same device is to be used for the detection of both low energy and high energy photons, then the Photocathode illumination can alternate between ON and OFF states; the high energy photons are measured when the illumination is OFF, and the low energy photons are measured when the illumination is ON. The wavelength of this illumination may also be modified to modulate the energy of the emitted electrons, thus increasing the SNR.

According to another broad aspect of the present invention, there is provided a device for use in measuring photon energy, the device comprising at least one pixel unit comprising a Photocathode that emits electrons in response to absorbed photons; an Anode; and a control unit comprising a Gate electrode in the form of a grid between the Photocathode and the Anode and a voltage supply unit, the control unit being configured and operable for controlling an electric current from the Photocathode to the Anode by affecting the voltage supply to the Gate or affecting a potential difference between the Photocathode and the Anode; said controlling providing for selectively preventing electrons arrival to the Anode to thereby scan a spectrum of the photon energies incident to the Photocathode.

According to yet another broad aspect of the present invention, there is provided a device for use in measuring photon energy, the device comprising at least one pixel unit comprising a Photocathode that emits electrons in response to absorbed photons; an Anode; an illuminator operable to illuminate the Photocathode with radiation of a wavelength of at least the energy band gap of the Photocathode material; and a control unit for controlling an electric current from the Photocathode to the Anode so as to selectively prevent electrons arrival to the Anode to thereby scan a spectrum of photon energies incident to the Photocathode.

According to yet another broad aspect of the present invention, there is provided a photonic detector for detecting photon energies in infrared spectral range, the detector comprising a Photocathode that emits electrons in response to absorbed photons; an Anode; an illuminator operable to illuminate the Photocathode with predetermined radiation; and a control unit for controlling an electric current from the Photocathode to the Anode so as to selectively prevent electrons' arrival to the Anode to thereby scan a spectrum of photon energies incident to the Photocathode.

The present invention in its further aspect provides a method for use in measuring photon energy, the method comprising
providing at least one pixel unit including an electrodes' arrangement formed by at least a Photocathode and an Anode, and configured to allow photons' access to the surface of the Photocathode opposite the Anode,
exposing the Photocathode to a photons' flux to thereby emit electrons from the Photocathode;
operating the electrodes' arrangement by applying a retarding electric field for controlling an electric current from the Photocathode to the Anode so as to selectively prevent electrons' arrival to the Anode to thereby scan a spectrum of the photon energies incident to the Photocathode.

BRIEF DESCRIPTION OF THE DRAWINGS

In order to understand the invention and to see how it may be carried out in practice, preferred embodiments will now be described, by way of non-limiting example only, with reference to the accompanying drawings, in which.

DETAILED DESCRIPTION OF THE INVENTION

Figure 1:
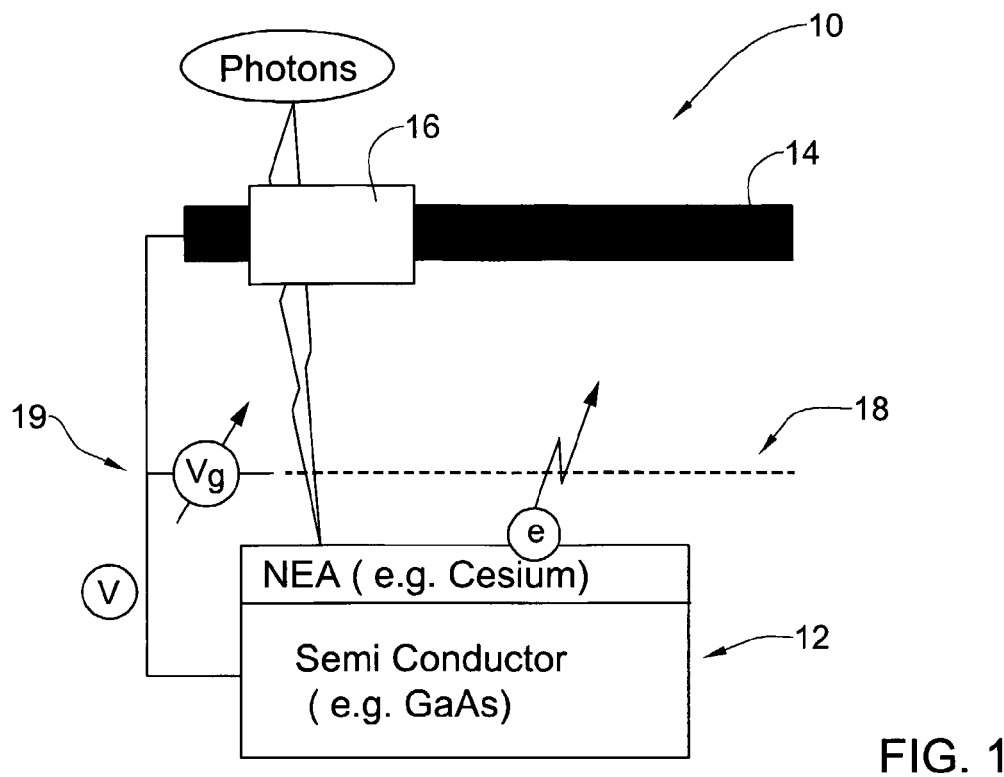
FIG. 1 schematically illustrates one example of a single-pixel detector device of the present invention.

Referring to FIG. 1, there is schematically exemplified an imaging detector, generally designated 10, constructed and operated according to the invention. This detector actually represents a single pixel detector. It should be understood, although not specifically shown, that a pixel array arrangement (camera) can be constructed from an array (one- or two-dimensional array) of such detectors 10.

The detector 10 includes an electrodes' arrangement formed by at least a Photocathode structure 12 emits electrons in response to absorbed photons, and an Anode electrode 14. The electrodes' arrangement is configured to allow photons access to the Photocathode electrode. In the present example of FIG. 1, this is implemented by making the Anode electrode 14 with a transparent window 16 aligned with the Photocathode 12. Alternatively, or additionally, this can be achieved by making the Photocathode at least partially transparent, allowing photons access to the Photocathode from its opposite side.

The Photocathode 12 is selected to have a work function lower than the photon energy to be measured. In the present example, the Photocathode 12 includes a semiconductor layer (e.g., GaAs) with a coating made from a Negative Electron Affinity (NEA) material (e.g., Cesium), which may be organic or inorganic material of the kind capable of creating a dipole layer on the surface to thereby reduce the work function or even make it negative.

Also provided in the device 10 is a control unit 19 for controlling an electric current from the Photocathode 12 to Anode 14 so as to selectively prevent electrons arrival to the Anode to thereby scan a spectrum of photon energies arriving at the Photocathode. In the present example of FIG. 1, the control unit 19 includes a Gate electrode 18 in the form of grid between the Photocathode and Anode, and a voltage supply unit 17. The Gate 18 serves as a controller of an electric current between the Photocathode and Anode such that emitted electron either moves to the Anode or remains near the Photocathode, thereby allowing for scanning the spectrum. The provision of a Gate electrode grid is optional and may be replaced by appropriately varying a potential difference between the Photocathode and Anode electrodes. The control unit 19 thus includes the controllable voltage supply unit 17 operating either to maintain a certain potential difference between the Photocathode and Anode electrodes and controlling the voltage variation of the Gate electrode, or to provide a controllably variable potential difference between the Photocathode and Anode. The variation of the potential difference between the Photocathode and Anode provides for increasing a signal to noise ratio of the detector device.

When photons to be measured hit the surface of Photocathode 12, this causes emission of electrons from the Photocathode. In the present example of a semiconductor-based Photocathode, photons' incidence onto the Photocathode causes generation of hole-electron pairs, where the electron jumps to the conduction band of the Photocathode material (GaAs) due to the energy of photon, and is emitted from the GaAs-surface with a residual energy that equals the energy difference between the photon energy and the band gap of GaAs. By appropriately applying an electric field to the Gate 18, the electron emission from the Photocathode 12 is controlled such that the electron either moves to Anode 14 or remains near Photocathode 12.

For example, considering green photon energy of 2.5 eV, and a GaAs bandgap of 1.35 eV at room temperature, electrons will be emitted with energy of 1.15 eV. Then, applying a voltage smaller than 1.15V will enable the electron to reach the Anode 14. Otherwise, it will stay near the surface of GaAs-cathode.

In order to obtain the spectrum of projected light, the Gate voltage is to be changed gradually within the required range. A measured signal (i.e., an electric current between the Photocathode and Anode) represents the integral of the light spectrum. The spectral resolution can be controlled by varying the speed of changing the Gate voltage (the voltage derivative), i.e. changing the sweep time.

Another factor affecting the device operation is a distance between the Gate grid 18 and Photocathode 12. The smaller the distance between the Gate and Photocathode, the higher the number of electrons traversing the Gate grid during the scanning period. Preferably, the distance is from one micron up to several millimeters. In order to improve the signal-to-noise ratio, the Gate grid 18 may be made from a material with a work function higher than the photon energy which may be absorbed by the Gate.

As indicated above, instead of or additionally to using the transparent window 16 in Anode 14, the Photocathode 12 may be semi-transparent (i.e. transmissive). In this case, a thickness of the Photocathode should be in order of magnitude of the absorption length for the detected light.

As indicated above, the provision of a Gate electrode is optional. The spectrum scanning can be achieved by varying a potential difference between the Photocathode 12 and Anode 14 (instead of adding the Gate). This requires higher control voltages, but eliminates the need for a grid between the Photocathode and Anode. Thus, in this case, the control unit 19 is constituted only by the appropriately operated voltage supply unit.

The configuration of FIG. 1, however, might not be sufficiently effective for detection of IR light of low energy. This is because the absorbed photons might not have enough energy to elevate electrons from the valence band to the conduction band of the Photocathode material, and from there to vacuum.

Figure 2:
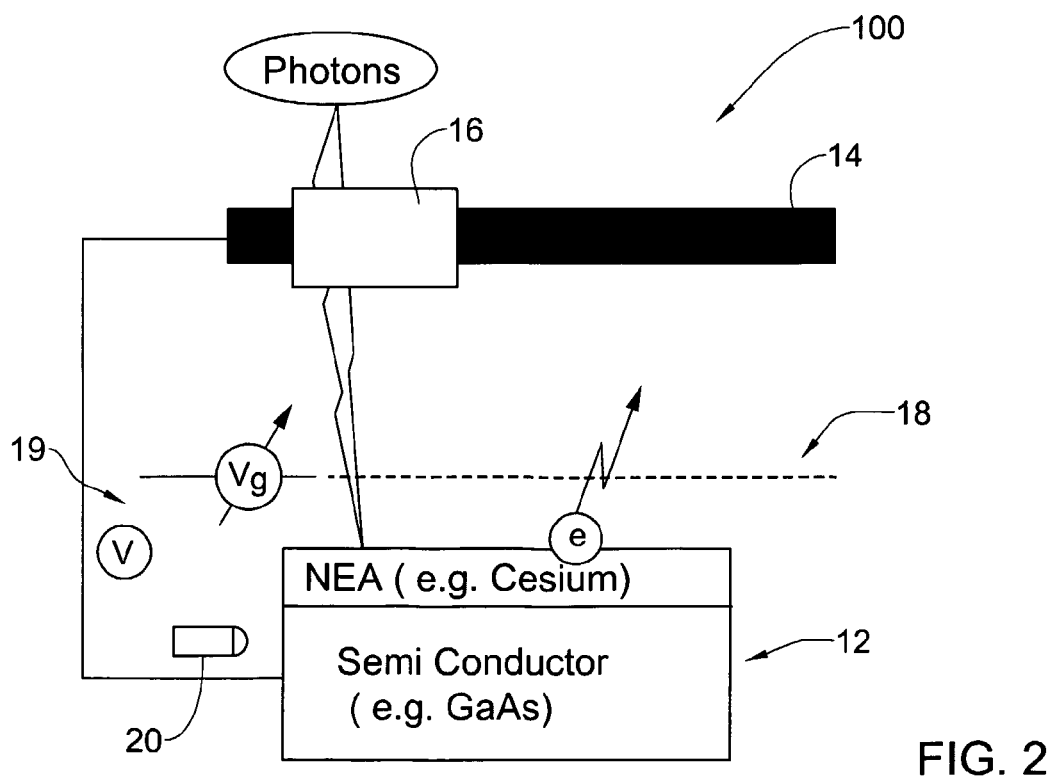
FIG. 2 schematically illustrates another example of the single-pixel detector device of the present invention.

The present invention solves the above problem by utilizing additional illumination of the Photocathode. This is exemplified in FIG. 2, showing a detector device (single pixel) 100. To facilitate understanding, the same reference numbers are used to identify those components which are common in the examples of FIGS. 1 and 2.

The detector device 100 includes an electrodes' arrangement formed by a Photocathode 12 and an Anode 14 (optionally with a transparent window 16), and optionally a Gate grid 18 which, together with a voltage supply unit 17, presents a control unit 19; and includes an illuminator (pumping light source) 20. The latter (which may be a small LED) operates in a wavelength range corresponding to the bandgap of the semiconductor used in the Photocathode to "pump" electrons from the valence band to the conduction band. This causes a situation in which the conduction band is highly populated and therefore photons with very small energy (less than 0.1 eV) can cause electron emission.

The illuminator 20 can be either continuously operated to illuminate Photocathode 12 during the operation of device 100, or operated in pulses. In the latter case, photons of higher energies are measured when the illuminator is inoperative (OFF state), and photons of lower energies are measured when the illuminator is operative (ON state). It should also be noted that the wavelength of illumination may be modified to modulate the energy of emitted electrons, thus increasing the SNR.

The following is the calculation of the performance of device 100. It is shown that this performance is obtained using the energy of pumping light (illuminator 20) of about 10 times higher than that of detected light (in terms of number of photons).

The performance of an IR detector is typically measured by a detectivity parameter D* or the so-called NEP, which is the radiant flux in Watts at a specified wavelength incident on the detector which gives a signal-to-noise ratio of unity. Detectivity D* is measured as the normalized performance of the detector, thus allowing to compare detectors of different materials, unequal areas, and different noise bandwidths. Detectivity D* is measured in units of $cm \cdot Hz^{1/2} \cdot W^{-1}$. The following calculation of detectivity D* shows that the detector 100 is background limited, which means the optimal performance of the detector device. It should be noted that this detectivity D* is achieved without the need to cool the detector device.

The Probability Density Function, p(Energy), can be expressed by:

$$p(\text{Energy}) = \frac{1}{kT} e^{\frac{-E}{kT}}$$

wherein E is the photon energy; k is the Boltzman constant; and T is the temperature in degrees Kelvin.

The Probability to find an electron with energy higher than a given energy $E_0$ equals to:

$$P(E > E_0) = \int_{E_0}^{\infty} p(E) dE = e^{\frac{-E_0}{kT}}$$

$k = 1.38 \cdot 10^{-23}$ J/K

T=300K $kT@300°$ K.=1/38.681 eV

For kT=1/38.681, $E_0$=0.124 Ev (equals to 10 μm), and accordingly:

$P(E_0 > 0.124 \text{ eV}) = e^{-0.124 \cdot 38.681} = 0.00826$

NEP is determined as:

$$NEP = \frac{I_{\text{noise}}}{R} [W]$$

$$\text{Resposivity } R = \frac{\text{Signal}}{\text{Input}} \left[\frac{A}{W}\right]$$

$$R = \frac{N_0 \cdot N_p \cdot Y}{N_p \cdot E_0} = \frac{N_0 \cdot Y}{E_0} \left[\frac{A}{W}\right]$$

$I_{\text{noise}} = P(E_0) \cdot N_0 \cdot 1.6 \cdot 10^{-19}$ $$NEP = \frac{P(E_0) \cdot N_0 \cdot 1.6 \cdot 10^{-19}}{\frac{N_0 \cdot Y}{E_0}} = \frac{1.6 \cdot 10^{-19} E_0 \cdot P(E_0)}{Y}$$

Detectivity D* is determined as:

$$D^* = \frac{\sqrt{\text{Area} \cdot \text{NoiseBandWidth}}}{NEP} > \frac{1}{NEP}$$

wherein $N_0$ is the electron population per cm² at the conduction band (the deep axis is neglected as it appears both in numerator and denominator of R); $N_p$ is the number of photons per second hitting cm² ("$N_0$ area"); Y is the Probability of a photon to emit electron from the conduction band.

Now, the following assumptions are made: (1) parameters Y and $N_p$ are independent of wavelength λ of incident light; (2) differences of the "thickness" of the conduction band for emitting thermal electrons and emitting photoelectrons can be neglected; the absorption coefficient for 10 μm photons is about $10^{-4}$; and the Yield (Y) for Cs—GaAs is $10^{-1}$.

Accordingly, for NEP and D* we obtain:

$$NEP = \frac{1.6 \cdot 10^{-19} \cdot 0.124 \cdot 0.00826}{10^{-5}} = 1.6 \cdot 10^{-17} \left[\frac{W}{\sqrt{\text{cm}^2 \cdot \text{Hz}}}\right]$$

$$D^* = 6.25 \cdot 10^{16} \left[\text{jones} = \frac{\sqrt{\text{cm}^2 \cdot \text{Hz}}}{W}\right]$$

For comparison, typical D* of a photonic detector is $10^{12}$ Jones, and of a thermal detector is $10^9$ Jones.

The advantages of a photodetector device of the present invention are thus self-evident. The detector has a simple construction that provides for single-pixel light detection in the entire spectrum including IR spectral range, while eliminating the need for cooling the detector, and provides for significantly higher detection efficiency.

Those skilled in the art will readily appreciate that various modifications and changes can be applied to the embodiments of the present invention as hereinbefore described without departing from its scope defined in and by the appended claims.

The invention claimed is:

1. A device for use in measuring photon energy, the device comprising:
   at least one pixel unit comprising
      at least a Photocathode exposed to electromagnetic radiation to emit electrons in response to absorbed photons, and
      an Anode electrode;
   a control unit comprising a voltage supply to at least one electrode and configured for scanning a spectrum of energies of electrons emitted from the Photocathode electrode said scanning comprising varying a retarding electric field in a vicinity of the Photocathode thereby inducing a change in an electric current from the Photocathode to the Anode by selectively preventing arrival to the Anode of electrons having energies below a certain given energy value corresponding to the applied retarding field, the spectrum of electron energies correlating with energy distribution of photons incident onto the Photocathode and causing emission of said electrons, a change in the electric current being therefore indicative of the spectrum of photon energies incident on the Photocathode.

2. The device of claim 1, wherein the Photocathode is configured to have a work function lower than the photon energy to be measured.

3. The device of claim 1, wherein the Photocathode is configured as a structure formed by a semiconductor layer with a coating having negative electron affinity that reduces the work function of the Photocathode.

4. The device of claim 3, wherein the Photocathode structure includes a GaAs layer with a Cesium coating.

5. The device of claim 3, comprising an illuminator operable to illuminate the Photocathode with radiation of a wavelength range of at least the energy of a band gap of the Photocathode material.

6. The device of claim 5, wherein the intensity of said predetermined radiation generated by the illuminator is about 10 times the intensity of the photons to be detected.

7. The device of claim 5, wherein said illumination is applied to the Photocathode either continuously or periodically.

8. The device of claim 5, wherein said illumination applied to the Photocathode has a varying wavelength.

9. The device of claim 1, wherein the Anode electrode is formed with an optically transparent window allowing the photons access to the surface of the Photocathode opposite the Anode.

10. The device of claim 1, wherein the Photocathode is at least partially transparent allowing the photons hitting the surface of the Photocathode to emit electrons.

11. The device of claim 10, wherein a thickness of the Photocathode is in order of magnitude of an absorption length for light to be detected.

12. The device of claim 1, wherein said control unit comprises a Gate electrode in the form of a grid located between the Photocathode and the Anode, and a voltage supply unit.

13. The device of claim 12, wherein said voltage unit is configured and operable to change gradually a voltage supply to the Gate electrode within a required range, thereby implementing said scanning of the spectrum.

14. The device of claim 13, wherein said voltage unit is configured and operable to vary a speed of changing the Gate voltage, thereby controlling a spectral resolution.

15. The device of claim 12, wherein the Gate electrode is made from a material with a work function higher than the photon energy to be detected.

16. The device of claim 12, wherein the voltage unit is configured and operable to controllably vary a potential difference between the Photocathode and the Anode.

17. The device of claim 1, wherein the control unit comprises a voltage unit configured and operable to controllably vary a potential difference between the Photocathode and the Anode.

18. The device of claim 17, wherein the variation of the potential difference between the Photocathode and the Anode provides said scanning of the spectrum.

19. The device of claim 17, wherein the variation of the potential difference between the Photocathode and the Anode provides for increasing a signal to noise ratio of the detector device.

20. The device of claim 1, comprising an illuminator operable to illuminate the Photocathode with predetermined radiation.

21. The device of claim 20, wherein intensity of said predetermined radiation generated by the illuminator is about 10 times the intensity of the photons to be detected.

22. An imaging device comprising an array of detectors each configured as the device of claim 1, thereby forming together a pixel arrangement of the imaging device.

23. The device of claim 1, wherein said control unit has one of the following configurations, a configuration selected from the group consisting of
the control unit comprises at least one Gate electrode located between the Photocathode and the Anode, and a voltage supply unit configured and operable to controllably vary the voltage supply to the Gate, thereby providing the controllably varying retarding electric field to the Photocathode; and
the control unit comprises a voltage supply unit configured and operable to controllably vary a potential difference between the Anode and the Photocathode thereby providing the controllably varying retarding electric field in the vicinity the Photocathode.

24. The device of claim 1 wherein the control unit is configured and operable to analyze data indicative of the electric current and determine data indicative of a number of incident photons, which have energies above the certain given energy value corresponding to the retarding field, said data being indicative of a spectrum of the photon energies incident on the Photocathode and having energies above said certain given energy value.

25. A method for measuring photon energy, the method comprising:
providing at least one pixel unit including an electrodes' arrangement formed by at least a Photocathode and an Anode and configured to allow photons' access to the Photocathode;
exposing the Photocathode to a photons' flux, the photon's flux having certain spectral distribution, to thereby emit electrons from the Photocathode, the emitted electrons thereby having energy distribution corresponding to said certain spectral distribution;
scanning the energy distribution of electrons, said scanning comprising applying a controllably varying retarding electric field in a vicinity of the Photocathode to selectively prevent arrival of electrons, of different energies having energies below a certain given energy value corresponding to the applied retarding field, to the Anode and inducing a corresponding change in an electric current from the Photocathode to the Anode; and
analyzing data representative of the electric current corresponding to different retarding electric fields and
determining a number of incident photons having energies above a certain given energy values corresponding to the different retarding field.

26. The method of claim 25, comprising irradiating the Photocathode with predetermined radiation.

27. The method of claim 26, wherein said radiation is of a wavelength range of at least the energy of a band gap of the Cathode structure.

28. The method of claim 26, wherein intensity of said radiation is about 10 times the intensity of the photons to be detected.

29. The method of claim 26, wherein said irradiating is carried out either continuously or periodically.

30. The method of claim 26, wherein said irradiating is carried out with a varying wavelength of said radiation.

31. The method of claim 25, wherein the pixel unit comprises a Gate electrode between the Photocathode and the Anode, said operating comprising changing gradually a voltage supply to the Gate electrode within a required range, thereby implementing said scanning of the spectrum.

32. The method of claim 31, wherein said operating comprises varying a speed of changing the Gate voltage, thereby controlling a spectral resolution.

33. The method of claim 25, wherein said operating comprises varying a potential difference between the Photocathode and the Anode.

34. The method of claim 33, wherein the variation of the potential difference between the Photocathode and the Anode provides said scanning of the spectrum.

35. The method of claim 33, wherein the variation of the potential difference between the Photocathode and the Anode provides for increasing a signal to noise ratio of the pixel unit.

* * * * *